United States Patent

Fujisaki et al.

Patent Number: 6,011,865
Date of Patent: Jan. 4, 2000

[54] HYBRID ON-LINE HANDWRITING RECOGNITION AND OPTICAL CHARACTER RECOGNITION SYSTEM

[75] Inventors: Tetsunosuke Fujisaki, Armonk, N.Y.; William David Modlin, Boca Raton, Fla.; Kottappuram Mohammedali Mohiuddin, San Jose, Calif.; Hiroyasu Takahashi, Yokohama, Japan

[73] Assignee: International Business Machines Corporation, Armonk, N.Y.

[21] Appl. No.: 08/061,495

[22] Filed: May 12, 1993

[51] Int. Cl.$^7$ .................................................. G06K 9/00
[52] U.S. Cl. .................................................. 382/189
[58] Field of Search .................................. 382/3, 7, 9, 13, 382/14, 15, 20, 21, 25, 18, 19, 26, 27, 37, 41, 47, 187, 189, 156–159, 310

[56] References Cited

U.S. PATENT DOCUMENTS

| | | | |
|---|---|---|---|
| Re. 31,692 | 10/1984 | Tyburski et al. | 382/7 |
| 3,111,646 | 11/1963 | Harmon | 340/146.3 |
| 3,949,363 | 4/1976 | Holm | 382/7 |
| 4,024,500 | 5/1977 | Herbst et al. | 340/146.3 SG |
| 4,284,975 | 8/1981 | Odaka | 340/146.3 J |

(List continued on next page.)

FOREIGN PATENT DOCUMENTS

| | | |
|---|---|---|
| 0608708A2 | 3/1994 | European Pat. Off. . |
| 3822671A1 | 11/1990 | Germany . |

OTHER PUBLICATIONS

Copy of Search Report for counterpart application No. 94105890.1 (1995).

"A Neural Net OCR Using Geometrical and Zonal–pattern Features" by Hiroyasu Takahashi, Proceedings of the First International Conference for Document Analysis and Recognition, Sain–Malo, France, pp. 821–828 (1991). no month.

(List continued on next page.)

*Primary Examiner*—Christopher S. Kelley
*Attorney, Agent, or Firm*—Robert P. Tassinari; Perman & Green, LLP

[57] ABSTRACT

The hybrid handwriting recognition method includes the steps of (a), in response to a handwriting input from a user, providing dynamic, time ordered stroke information; (b) determining a first list comprised of at least one probable character that the dynamic, time ordered stroke information is intended to represent; (c) converting the dynamic, time ordered stroke information to static stroke information; (d) determining a second list comprised of at least one probable character that the static stroke information represents; and (e) merging the first list and the second list to provide a third, unified list comprised of at least one element representing a most probable character that the dynamic, time ordered stroke information is intended to represent. The step of converting includes the steps of generating a static, bit-mapped representation of the dynamic stroke information, and generating one or more first stroke features based on contour directions of the bit-mapped stroke information. The first stroke features are applied as inputs to a plurality of neural network recognizers.

20 Claims, 6 Drawing Sheets

U.S. PATENT DOCUMENTS

| | | | |
|---|---|---|---|
| 4,317,109 | 2/1982 | Odaka et al. | 340/146.3 AC |
| 4,542,526 | 9/1985 | Satoh et al. | 382/13 |
| 4,628,532 | 12/1986 | Stone et al. | 382/21 |
| 4,653,107 | 3/1987 | Shojima et al. | 382/13 |
| 4,654,873 | 3/1987 | Fujisawa et al. | 382/9 |
| 4,680,804 | 7/1987 | Kuzunuki et al. | 382/13 |
| 4,696,048 | 9/1987 | Sado et al. | 382/13 |
| 4,718,103 | 1/1988 | Shojima et al. | 382/13 |
| 4,727,588 | 2/1988 | Fox et al. | 382/13 |
| 4,731,857 | 3/1988 | Tappert | 382/9 |
| 4,752,965 | 6/1988 | Dunkley et al. | 382/13 |
| 4,764,972 | 8/1988 | Yoshida et al. | 382/13 |
| 4,805,225 | 2/1989 | Clark | 382/15 |
| 4,837,842 | 6/1989 | Holt | 382/7 |
| 4,860,372 | 8/1989 | Kuzunuki et al. | 382/13 |
| 4,878,249 | 10/1989 | Mifune et al. | 382/13 |
| 5,029,223 | 7/1991 | Fujisaki | 382/13 |
| 5,034,989 | 7/1991 | Loh | 382/13 |
| 5,105,468 | 4/1992 | Guyon et al. | 382/15 |
| 5,109,426 | 4/1992 | Parks | 382/13 |

OTHER PUBLICATIONS

"Segmentation Procedure For Handwritten Symbols And Words", Kurtzberg et al., IBM Technical Discl. Bulletin, vol. 25, No. 7B, Dec. 1982.

"Handwriting Recognition By Substroke Segmentation And Compostion", Kurtzberg et al., IBM Tech. Discl. Bulletin, vol. 27, No. 9, Feb. 1985.

"Flexible, Space–Time Segmenter For Handwritten Words", Fox et al., IBM Tech. Discl. Bulletin, vol. 29, No. 11, Apr. 1987.

"Global Prototype Establishment Procedure For Handwritten Character Recognition", IBM Tech. Discl. Bulletin, vol. 31, No. 9, Feb. 1989.

"Adaptive On–Line Handwriting Recognition", Tappert, IEEE Computer Soc., 1984, pp. 1004–1007. no month.

"Automatic Recognition Of Isolated Arabic Characters", El–Sheikh, Elsevier Science Publishers B.V., Jun. 1988, pp. 177–184.

"Cluster Analysis of English Text", Toussaint et al., IEEE, 1987, pp. 164–172. no month.

"Emperial Tests For Feature Selection Based On A Psychological Theory Of Character Recognition", Blesser et al., Pereamon Press, vol. 8, Aug. 1976, pp. 77–85.

"Low Error Rate Optical Character Recognition of Unconstrained Handprinted Letters Based On a Model of Human Perception", Suen et al., IEEE Transactions On Systems, Man, and Cybernetics, Jun. 1977, pp. 491–495.

"On A Method Of Selection of Representative Patterns Using Binary Distance Matrix", Som et al., IEEE Transactions on Systems, Man and Cybernetics, vol. 10, No. 8, Aug. 1980, pp. 524–529.

"Online Recognizer For Runon Handprinted Characters", Fujisaki et al., Proceedings of the Tenth Int'l. Conference On Pattern Recognition, Jun. 16–21, 1990, pp. 450–454.

"A Psychological Approach To the Human Recognition of Ambiguous Characters", Watanabe et al., J. Inst. TV Engrs. of Japan, vol. 39, No. 6, (1985), pp. 509–515.

"Word Processing With On–Line Script Recognition", Doster et al., IEEE, 1984, pp. 36–43.

FIG. 4
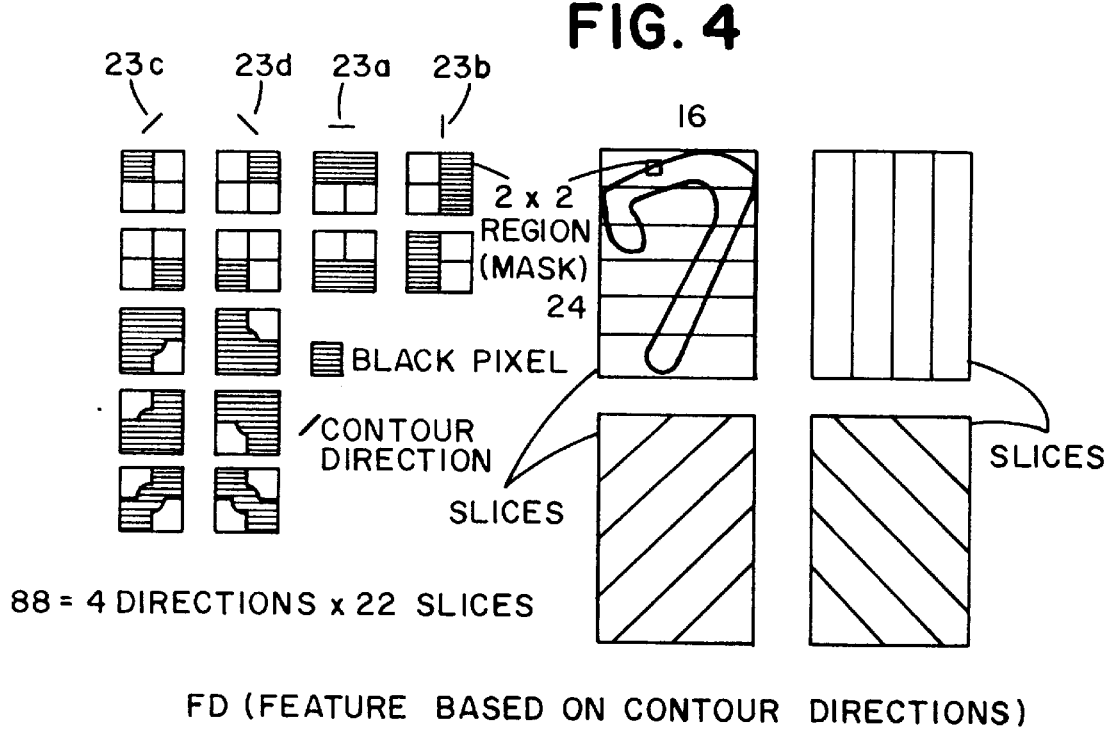
FD (FEATURE BASED ON CONTOUR DIRECTIONS)
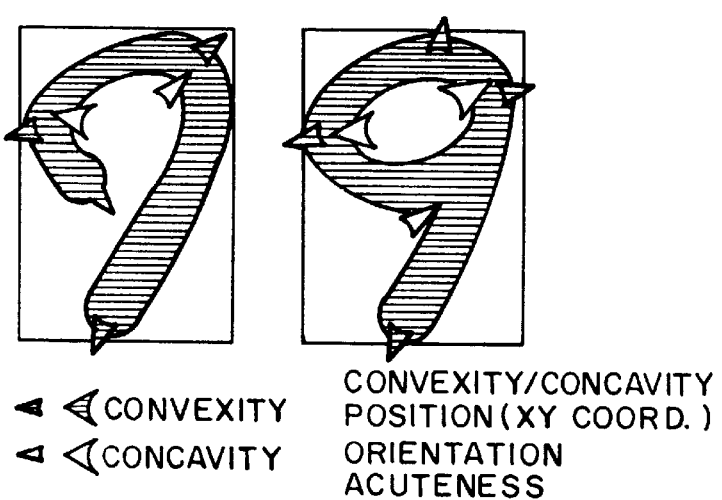
FB (FEATURE BASED ON BENDING POINTS)
FIG. 5

HYBRID ON-LINE HANDWRITING RECOGNITION AND OPTICAL CHARACTER RECOGNITION SYSTEM

FIELD OF THE INVENTION

This invention relates generally to handwriting recognition systems and methods.

BACKGROUND OF THE INVENTION

Two basic approaches to computer-based handwriting recognition are known as on-line handwriting recognition (HWR) and off-line HWR. The off-line HWR approach is sometimes also referred to as optical character recognition (OCR). In general, the on-line HWR technique employs dynamic handwriting information, while the off-line HWR technique employs static handwriting information. These two approaches have historically been separately developed for use in different handwriting recognition environments.

For the case where a handwriting input device provides dynamic information, such as stroke direction and stroke order, the use of on-line HWR technique has traditionally been preferred because, for a given set of input characters, on-line HWR generally provides better recognition accuracy than the off-line HWR technique. A stylus-based (or pen-based) computer that captures strokes from an integrated digitizer tablet is one exemplary application that has benefitted from the use of on-line HWR.

The off-line HWR technique, on the other hand, has traditionally been employed for applications where dynamic information from a digitizer was not available. By example, when documents are scanned from a scanner the input data stream does not contain dynamic handwriting information. As such, the on-line HWR approach is unsuitable for use, and the off-line HWR approach provides a viable alternative.

While the on-line HWR technique provides superior results when dynamic stroke information is available, it has drawbacks as well. For example, the on-line HWR technique can exhibit a sensitivity to user-dependent letter formation. That is, the on-line HWR technique operates best with a well-formed presentation of the constituent strokes of a letter or numeral. The on-line HWR technique may thus exhibit a sensitivity to the order of formation and the number of constituent strokes. For example, the on-line HWR technique typically expects a user to write the letter "C" with a single touch of the pen and with a counter clock-wise stroke. This is, however, but one possible way for a user to form the letter "C". For example, a multi-stroke, clockwise pen motion can also be used.

Often complicating the problem presented by user-dependent character formation is the unnaturalness that many users experience when writing with a conventional stylus/digitizer tablet. Because the feel of the stylus on the surface of the digitizer tablet may not replicate the feel of a pen or pencil on paper, and in that the visual feedback is different than what the user is accustomed to, the resultant input characters may be ill-formed, or formed with an unnatural stroke sequence and/or direction. The retracing of strokes by the user is particularly troublesome for the dynamic HWR technique to properly handle. The end result can be the occurrence of recognition errors when using the on-line HWR technique.

The off-line HWR technique has been shown to be more robust when presented with such irregular handwritings, in that dynamic stroke information is not considered. However, and as was noted above, the overall recognition accuracy of the off-line HWR technique is generally less than that obtained when using the on-line HWR technique.

SUMMARY OF THE INVENTION

It is thus an object of this invention to provide a handwriting recognition system and method that employs both on-line HWR and off-line HWR to achieve a recognition accuracy that is improved over the use of either technique when used alone.

It is a further object of this invention to provide a handwriting recognition system wherein a dynamic character representation is converted to a static character representation, wherein the dynamic and the static representations are processed in parallel, and wherein the results of the processing of the dynamic and the static character representations are combined to select a most probable character as being a recognized character.

The foregoing and other problems are overcome and the objects of the invention are realized by a method of operating a handwriting recognition system, and by a handwriting recognition system that operates in accordance with the method. The method includes the steps of (a), in response to a handwriting input from a user, providing dynamic, time ordered stroke information; (b) determining a first list comprised of at least one probable character that the dynamic, time ordered stroke information is intended to represent; (c) converting the dynamic, time ordered stroke information to static stroke information; (d) determining a second list comprised of at least one probable character that the static stroke information represents; and (e) merging the first list and the second list to provide a third, unified list comprised of at least one element representing a most probable character that the dynamic, time ordered stroke information is intended to represent.

The step of converting includes a step of generating one or more first stroke features based on contour directions of the stroke information. It is within the scope of the invention to also generate and use other types of stroke features, such as features based on convexity and concavity of the stroke information.

The step of converting further includes an initial step of mapping the dynamic, time ordered stroke information to an N by M bit-mapped representation or image thereof. The step of mapping includes a step of scaling the dynamic, time-ordered stroke information such that a stroke, or an assemblage of strokes, is wholly contained within the N by M bit-mapped representation.

The step of determining a second list may be accomplished with at least one neural network having a plurality of input nodes for receiving the first stroke features. The at least one neural network further has at least one output node for outputting at least one probable character in response to the first stroke features.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 illustrates a handwriting Feature based on contour Directions (FD), which forms a part of the off-line HWR sub-system of FIGS. 1a or 1b;

FIG. 5 illustrates a handwriting Feature based on Bending points (FB), which may optionally be used as a part of the off-line HWR sub-system of FIGS. 1a or 1b;

DETAILED DESCRIPTION OF THE INVENTION

Figure 1A:
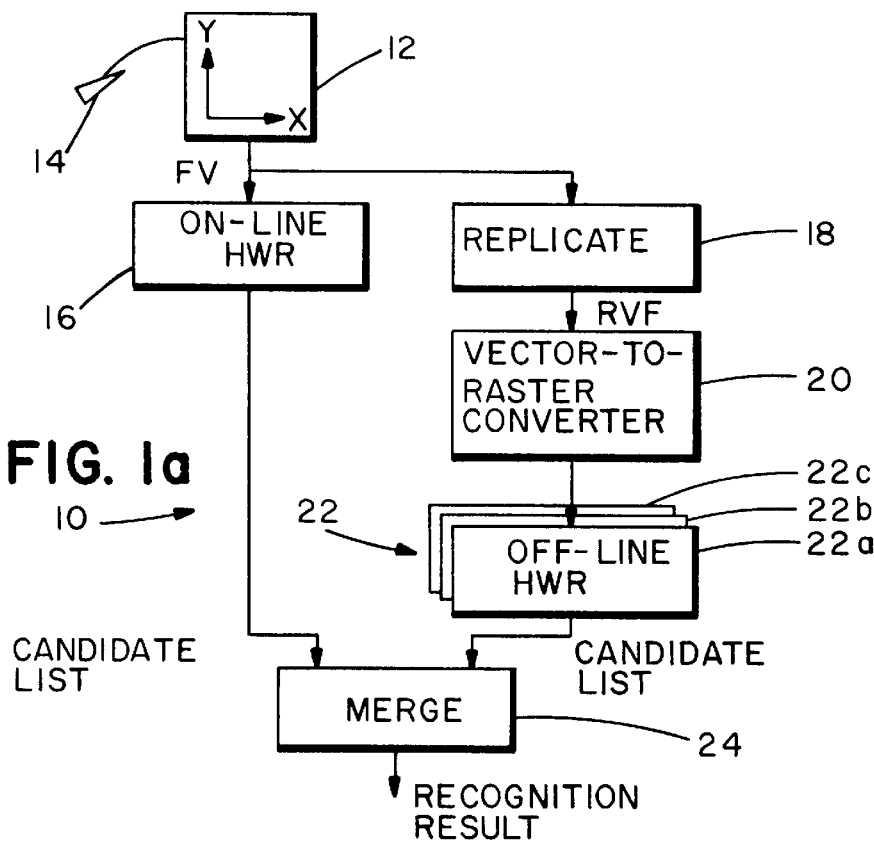
FIG. 1a is a block diagram of a handwriting recognition system that is constructed and operated in accordance with a first embodiment of the invention, the system including an on-line HWR sub-system and an off-line HWR sub-system.

FIG. 1a is a block diagram of a first embodiment of a handwriting recognition system 10 that is constructed and operated in accordance with the invention to include an on-line HWR sub-system and an off-line HWR sub-system. The system 10 includes a handwriting transducer shown generally as a digitizer tablet 12 and a stylus or pen 14. The output of the digitizer tablet 12 is a feature vector (FV), that is, a time ordered sequence of strokes which constitute a letter, numeral, or other character of an alphabet set. A stroke is an array of X-Y coordinates that represents the trajectory of the pen 14. A stroke starts from pen-down and ends at pen-up.

Coupled to an output of the handwriting transducer is an on-line HWR engine or sub-system 16. The on-line HWR sub-system 16 receives dynamic handwriting information (feature vectors) from the output of the digitizer tablet 12 and processes this dynamic information, such as stroke numbers and stroke direction, to obtain a list of most probable characters, or candidate characters, that the input stroke or strokes represent. The on-line HWR sub-system may be embodied by a number of suitable on-line HWR apparatus and methods. One suitable on-line HWR technique is disclosed in commonly assigned U.S. Pat. No. 5,029,223, issued Jul. 2, 1991, entitled "Constraint Driven On Line Recognition of Handwritten Characters and Symbols", by T. Fujisaki, the disclosure of which is incorporated herein in its entirety.

In accordance with the teaching of this invention the HWR system 10 also includes an off-line HWR processor that includes a feature vector replication unit 18, a vector-to-raster converter 20, and an off-line HWR engine or sub-system 22. The replication unit 18 operates in a manner analogous to a data buffer to replicate or copy the feature vectors output by the digitizer tablet 12. The replicated feature vectors (RFV), which encode dynamic stroke information, are then converted to a static character representation by the converter 20 for input to the off-line HWR sub-system 22. In the presently preferred embodiment of the invention, the off-line HWR sub-system 22 includes three sub-systems, specifically an off-line HWR sub-system 22 a for recognizing upper case letters; an off-line HWR sub-system 22 b for recognizing lower case letters; and an off-line HWR sub-system 22 c for recognizing digits and special characters. The output of the off-line HWR sub-system 22 is a list of most probable characters, or candidate characters, that the static character information represents.

The off-line HWR sub-system 22 may be embodied by a number of suitable off-line HWR (OCR) apparatus and methods. A presently preferred off-line HWR technique employs neural networks as recognizers and is similar in some respects to an OCR technique disclosed in an article entitled "A Neural Net OCR Using Geometrical and Zonal-pattern Features" by Hiroyasu Takahashi, Proceedings of the First International Conference for Document Analysis and Recognition, Saint-Malo, France, pages 821–828 (1991).

It should be realized that the reference to an "off-line" HWR technique, in the context of this invention, is intended to indicate that static handwriting information is processed, as opposed to dynamic (on-line) handwriting information. As will become apparent below, the "off-line" HWR sub-system 22 is capable of operating in parallel with the on-line HWR sub-system 16 to process and recognize a user's handwriting in a substantially real-time manner. As such, the references to off-line and on-line HWR are intended to distinguish one from the other based on the type of information that is processed (static vs. dynamic), and not on the speed of processing or when the information is processed.

Coupled to the output of the on-line HWR sub-system 16 and to the output of the off-line HWR sub-system 22 is a merge logic unit 24 that operates to merge the lists of candidate characters, and may also select one or more most probable characters as being a recognition result of the system 10. The recognition result is thereafter stored and/or provided to a consumer of the recognized characters, such as a word processing program or a user interface program. The details of the consumer of the recognized characters is not germane to an understanding of this invention, and is not further discussed.

Figure 1B:
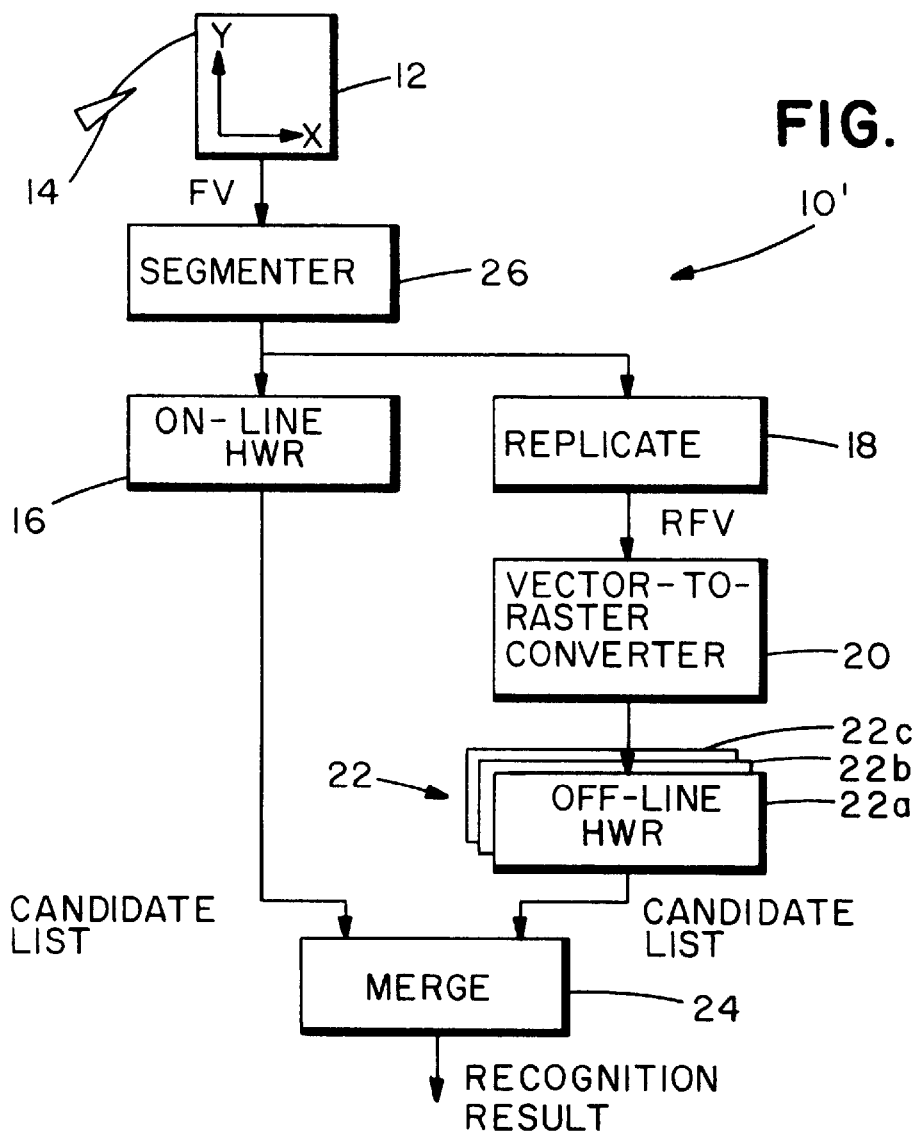
FIG. 1b is a block diagram of a handwriting recognition system that is constructed and operated in accordance with a second embodiment of the invention.
Figure 1C:
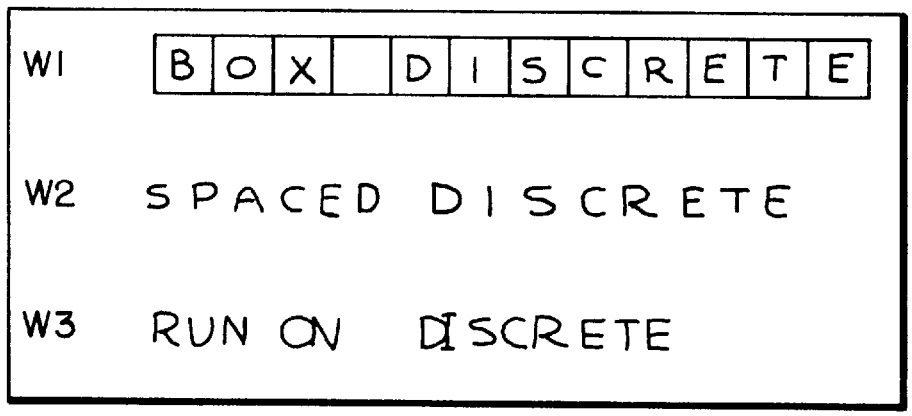
FIG. 1c illustrates three types of writings that are suitable for recognition by the handwriting recognition system of the invention.

The handwriting recognition system of FIG. 1a is particularly useful in recognizing a first type of writing (W1) shown in FIG. 1c. This type of writing is known as box discrete wherein individual characters are formed within individual areas, or boxes, thereby simplifying the task of character segmentation. That is, all strokes that are formed within a given box are assumed to be constituent strokes of a single character. A second type of writing (W2) is known as spaced discrete wherein the user intentionally forms each character such that no character touches another. A third type of handwriting (W3) is known as run-on discrete wherein the user may form characters that touch, or "run-on", to one another.

The second and third types of handwriting a preferably processed with a handwriting recognition system 10' that is illustrated in FIG. 1b. The system 10' is substantially identical in construction and operation to the system 10 of FIG. 1a, except for the coupling of a segmentation processor 26 between the tablet 12 and the remainder of the system. The purpose of the segmentation processor 26 is to group one or more stroke feature vectors into assemblages that may represent a character. For example, for the spaced discrete handwriting (W2) the segmentation processor 26 identifies all strokes that touch, or that approach one another to within some predetermined distance. All touching or nearly touching strokes are assumed to be constituent strokes of the same character, and the associated feature vectors are then passed to the remainder of the system 10' for recognition.

Describing now the off-line HWR processor of FIGS. 1a and 1b in greater detail, the replication unit 20 operates to convert the RFV stroke representations of a character into an N by M bit-map that is suitable for off-line handwriting feature extraction. Based on the static feature or features that are extracted from the bit-map, the off-line HWR sub-system 22 performs recognition of the input and provides the off-line candidate list. The off-line and on-line candidate lists are input to the merge logic unit 24 to produce a unified recognition result.

Based on the foregoing description it can be seen that the system 10 includes plural HWR engines or sub-systems that are capable of being operated in parallel with one another. In the presently preferred embodiment of the invention there are four such HWR engines that are capable of operating in parallel:

a. the on-line HWR sub-system 16;
b. the off-line HWR sub-system 22a for recognizing upper case letters;
c. the off-line HWR sub-system 22b for recognizing lower case letters; and
d. the off-line HWR sub-system 22c for recognizing digits and special characters.

The output of the handwriting transducer, that is, the digitizer tablet 12, is an array of strokes. This array is expected to represent a character such as "E", "a,∞ and "7". Each element of the stroke array corresponds to a constituent stroke of a character. When a character is written in a single stroke, the dimension of the stroke array is one. Each stroke is in turn represented by an array of X and Y coordinates. Pairs of X and Y coordinates are time-ordered and represent the trajectory of the pen 14 on the surface of the digitizer tablet 12 while the pen 14 is touching the surface of the digitizer tablet 12, or is within a certain proximity to the surface. Sampling of pen position X and Y coordinates by the digitizer tablet 12 occurs at fixed intervals of time, such as every ten milliseconds.

The stroke array is input to the on-line HWR sub-system 16 to determine which ASCII code is most-likely similar to the X-Y trajectories found in the array of strokes. Details of the operation of the on-line HWR sub-system 16 are not repeated here, as a description of one suitable type is found in the U.S. Pat. No. 5,029,223 that was previously incorporated by reference herein in its entirety.

As the result of the on-line recognition process, the on-line candidate character list is output by the on-line HWR sub-system 16. The candidate list contains one or more possible (most probable) candidate characters for the pen trajectories. Candidate characters are sorted in the order of likelihood, and each candidate character has a score associated therewith. The higher the score the higher is the probability that the candidate character is the correct character.

Referring now to the off-line HWR (OCR) sub-system, the vector-to-raster converter 20 generates an N row by M column bit-map from the stroke array. In the presently preferred embodiment of the invention N=24 and M=16. The converter 20 also operates to scale and normalize the size of characters within the 24×16 bit-map.

Figure 8A:
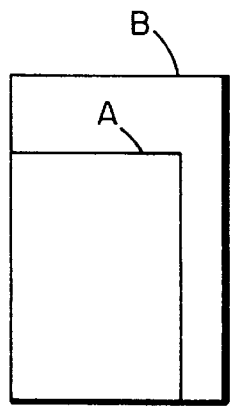
FIGS. 8a–8c are diagrams that are useful in explaining the normalization and scaling of input strokes prior to the extraction of static feature vectors.
Figure 8B:
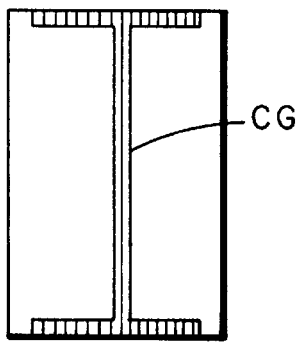
Figure 8C:
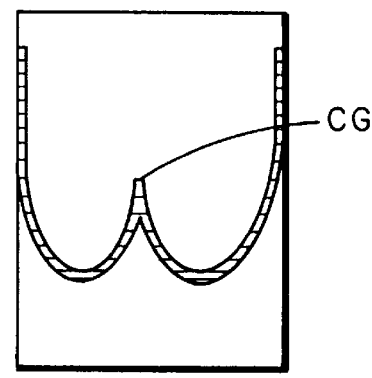

In this regard, reference is made to FIGS. 8a–8c. FIG. 8a illustrates two versions (A and B) of a wrapping or bounding box within which one or more strokes are accommodated. The bounding box is expanded (A) or contracted (B) as necessary to wholly enclose the stroke(s), while preserving the aspect ratio (height to width) of the bounding box. For the illustrated example, the aspect ratio is 24/16, or 3/2. FIG. 8b depicts the strokes that represent the letter "I" placed in the bounding box such that the strokes touch the upper and lower boundaries of the box. The strokes are centered along the horizontal (x axis) dimension such that the center of gravity (CG) of the strokes coincides with the geometric center of the box. FIG. 8c illustrates the case of the letter "W", wherein the left and right sides of the box contact the left and right sides of the letter, and wherein the strokes are centered along the vertical (y axis) such that the center of gravity of the strokes coincides with the geometric center of the box.

Figure 3:
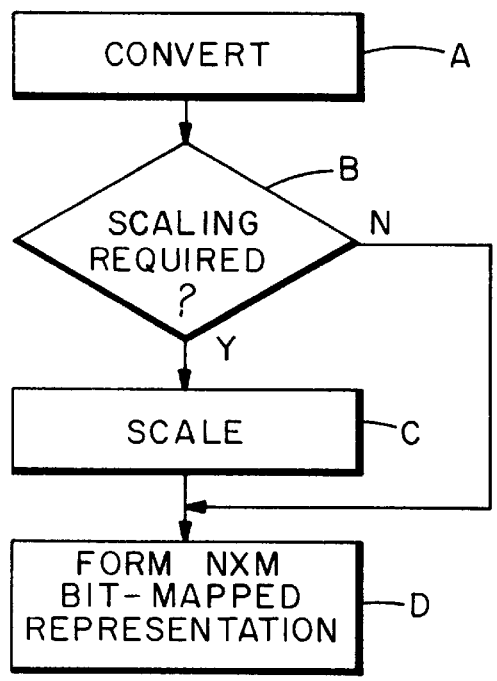
FIG. 3 is a logic flow diagram that illustrates a method of, converting and normalizing dynamic stroke information into a static bit-map for use by the off-line HWR sub-system of FIGS. 1a or 1b.

Referring to FIG. 3, and representing the j-th coordinate of the i-th stroke as ($x_{ij}$, $y_{ij}$), the conversion technique operates as follows.

FIG. 3, Block A: Convert the stroke from the tablet 12 coordinate system into a relative coordinate system such that every stroke coordinate ($x_{ij}$, $y_{ij}$) is measured from a point in the coordinate system of the bounding box.

FIG. 3, Blocks B and C: Scale the coordinates, while preserving the aspect ration of the bounding box, such that some of the strokes touch the boundary of the 24×16 bounding box, but do not cross the boundary. This size scaling is preferably applied only to cases where the trajectory of all constituent strokes cannot fit within a smaller box (smaller than the N by M bit-map), the size of which is specified as pre-determined parameters. This avoids the problem that would be created if, for example, periods and commas were scaled up so as to touch the boundary of the 24×16 bounding box.

FIG. 3, Block D: The trajectory of size normalized strokes are quantified within 24×16 regions of the bounding box, thereby bit-mapping the strokes (see FIG. 7). Only one bit or pixel is represented within each region, or cell of the bounding box. In accordance with this example, the bounding box has 24×16=384 discrete regions or cells.

In the presently preferred embodiment of the invention the off-line HWR sub-system 22 includes three identical neural networks (22a, 22b, and 22c). Each neural network is implemented as a feed-forward, three layer network with sigmoid function mapping. Each neural network is, however, trained to recognize a different class of symbols based on the inputs. specifically, the neural network 22a is trained for the class of upper case letters (A-Z), the neural network 22b is trained for the class of lower case letters (a–z), and the neural network 22c is trained for the class of digits (0–9), as well as for a plurality of special symbols.

Figure 7:
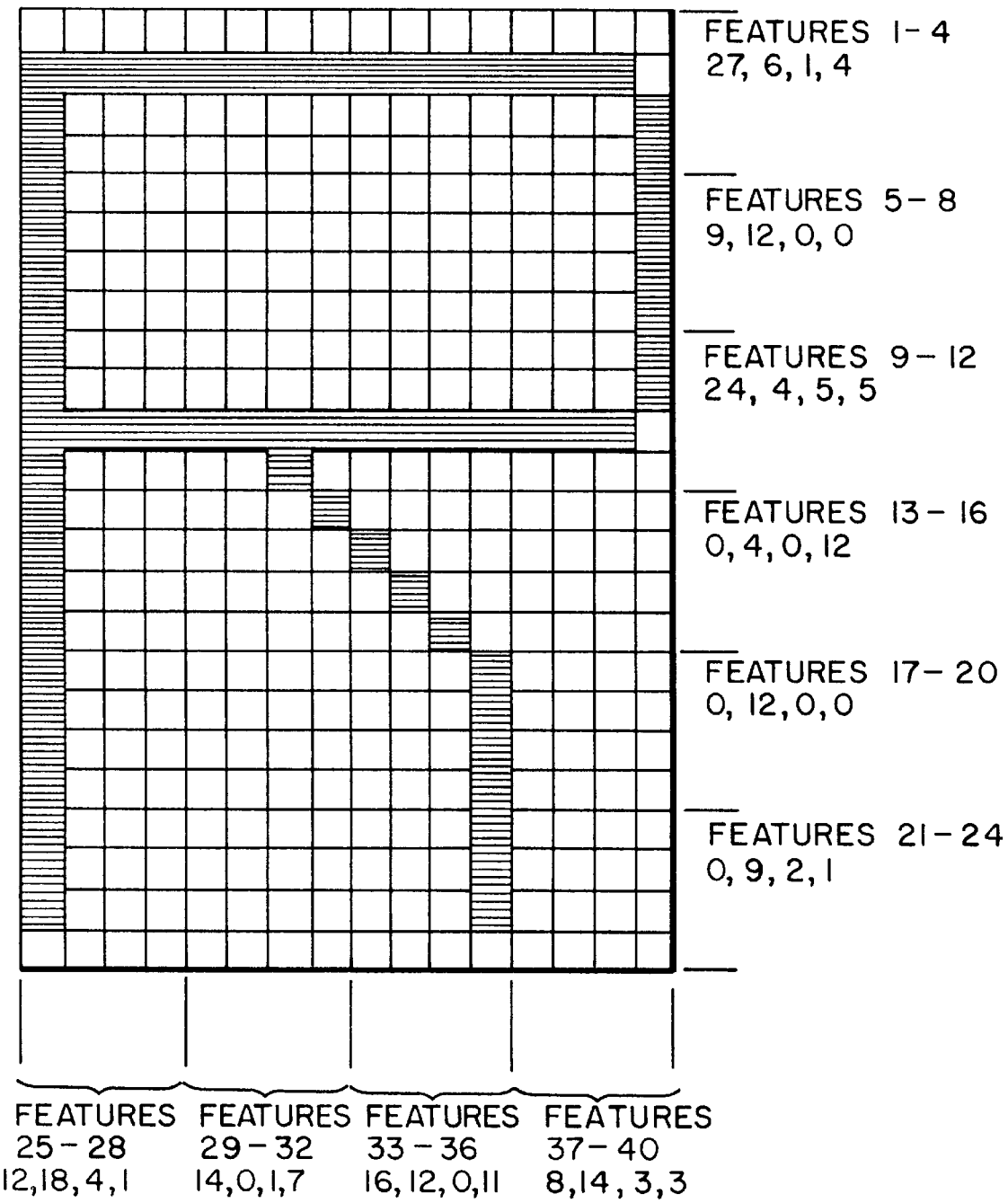
FIG. 7 is an example of a bit-mapped assemblage of strokes and illustrates the extraction the Features based on contour Directions (FD)

As seen in FIGS. 4 and 7, a front-end of the off-line HWR sub-system 22 extracts 88 features, referred to as a Feature based on contour Directions (FD), from 22 partitions or slices through the 24×16 bit-mapped image. The 88 features are comprised of:

(a) a projection of short horizontal vector patterns along the edge 23a in the 24×16 bit-map, projected over the X-axis;

(b) a projection of short vertical vector patterns along the edge 23b in the 24×16 bit-map, projected over the Y-axis;

(c) a projection of diagonal (Y=X) vector patterns along the edge 23c in the 24×16 bit-map, projected over the Y=−X axis; and (d) a projection of diagonal (Y=−X) vector patterns along the edge 23 d in the 24×16 bit-map, projected over the Y=X axis.

The histograms are determined based on an ixj mask, for example a 2×2 mask, that is scanned over the 384 cells of the 24×16 bit-mapped image of the stroke(s). A 2×2 mask is employed for efficiency, although other mask sizes may be employed in other embodiments of the invention if so desired. The mask is scanned cell-by cell horizontally along each row, and vertically along each column, of the 24×16 bit-mapped image of the stroke(s). Primitive features are detected if the number of black pixels (edge area) in the mask is between 1 and 3, i.e., if the four pixels within the mask are neither all black or all white. FIG. 4 illustrates the directions of the four primitive features 23a–23d. Each detected direction is counted four times according to its position in a total of 22 slices through the 24×16 bit-map in four projections. The 22 slices comprise six horizontal regions, four vertical regions, and a total of 12 diagonal regions. In that four directions of the primitive vectors (23a–23d) are accumulated within each of the 22 slices, there are a total of 22 times 4, or 88 FD components.

By example, FIG. 7 illustrates the strokes of the letter "R" that have been bit-mapped as described above. For clarity, only the six horizontal slices and four vertical slices are illustrated, as are values for some of the FD components. By example, Features 1 through 4 represent the total for each of the primitive vectors 23a, 23b, 23c, and 23d for the top-most horizontal partition or slice. In this example, the horizontal vector pattern 23a has a count of 27, the vertical vector pattern 23b has a count of 6, the diagonal vector pattern 23c has a count of 1, and the vertical vector pattern 23d has a count of 4.

Figure 6:
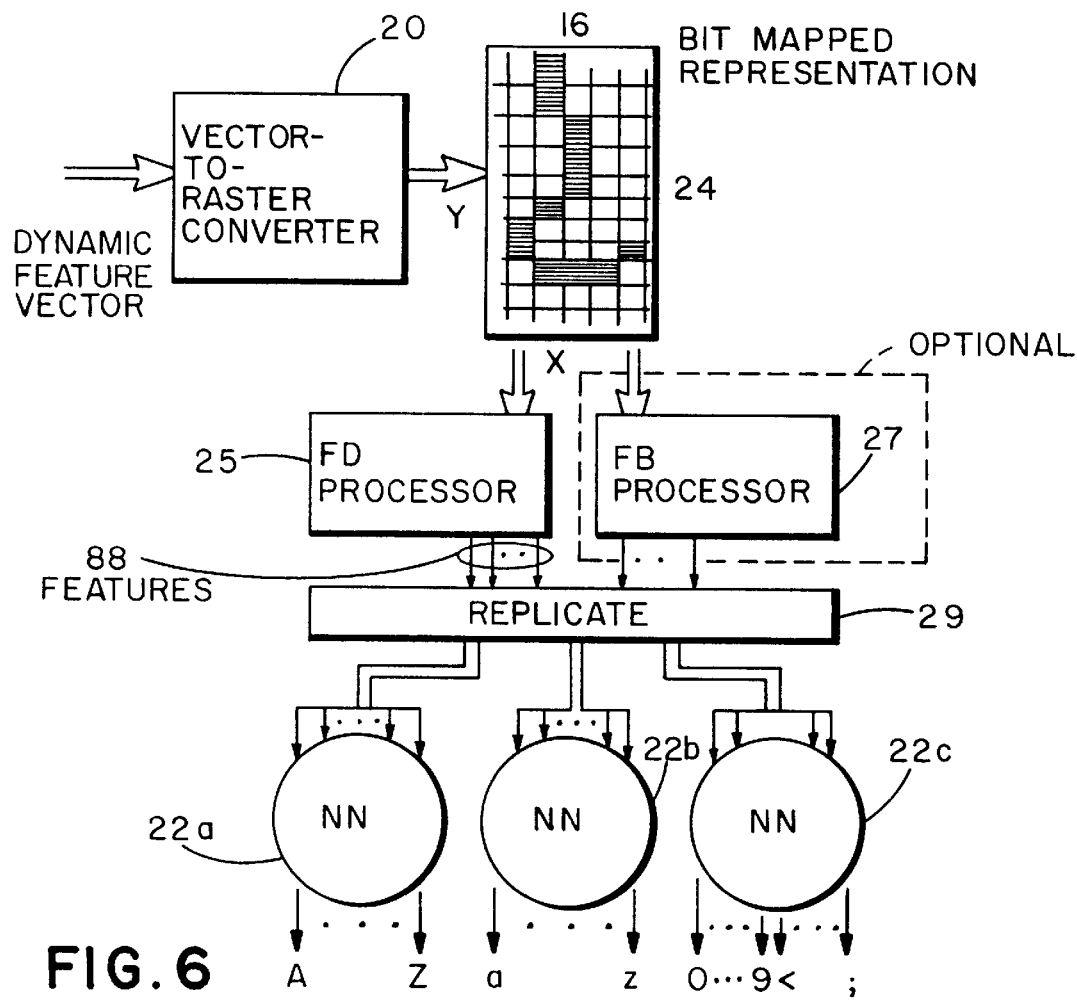
FIG. 6 depicts a combination of the static FD and FB components at the input to a plurality of neural networks that form an embodiment of the off-line HWR sub-system of FIGS. 1a and 1b.

It is also within the scope of the invention to extract other primitive features from the 24×16 bit-mapped image. By example, and referring to FIG. 5, a count of convex and concave patterns appearing in 2×3 regions can be made. The convex and concave patterns are treated as different features based on eight angles: (up, down, right, left, up-right, up-left, down-left, down-right). These features are referred to as Features based on Bending points (FB). FIG. 6 shows the optional use of a FD processor 27 for extracting the FD featured from the 24×16 bit-mapped image.

Another type of primitive feature that can be extracted from the 24×16 bit-mapped image is referred to as a Feature based on Smoothed Image (FS). For this case the 24×16 binary character image is reduced to a 12×8 gray image and smoothed using a Gaussian filter, yielding a total of 96 feature elements.

As such, it can be seen that the 24×16 bit-mapped image can be processed in accordance with a number of different techniques to extract feature elements therefrom for input to the neural network recognizers 22a–22c. Thus, although the present invention employs only the FD feature elements, other types of feature elements can be used to augment the FD feature elements (as shown in FIG. 6), or can be used in place of the FD feature elements.

As seen in FIG. 6, the 88 extracted FD feature elements output by an FD Processor 25 are replicated by block 29 into three sets of 88 FD feature elements. The FD Processor 25 operates as described above to partition the N×M bit-mapped image into 22 slices, scan the 2×2 mask over the image, and count occurrences of the primitive features 23a–23d within the slices.

Individual ones of each of the sets of 88 FD feature elements are provided to the input of one of the three neural networks (NN) 22a–22c. Each neural network has 88 inputs and at least one hidden layer. The neural networks 22a and 22b each have 26 output nodes corresponding to the symbols A through Z and a through z, respectively. The third neural network 22c has 30 output nodes corresponding to the 10 digits (0–9) and 20 special characters (e.g., punctuation, $, =, etc.).

Although the inputs are the same to the three neural networks 22a–22c, because of their training their outputs differ in response to these inputs. More specifically, using the back propagation technique the neural network 22a is trained positively on the 26 upper case letters, but trained negatively on the remaining 56 characters (26 lower case letters, 10 digits, and 20 special characters). The neural network 22b is trained positively on the 26 lower case letters, but trained negatively on the remaining 56 characters. The neural network 22c is trained positively on the 10 digits and 20 special characters, but trained negatively on the 52 upper and lower case letters. By example, positive training may be done over 2000 samples, and negative training may be done over 125 samples for each letter, digit, or special character, as appropriate.

In the presently preferred embodiment of the invention each neural network has 88 input nodes, in the range of approximately 40 to approximately 50 nodes in the hidden layer, and either 26 or 30 output nodes. Each input node is fully connected to the nodes of the hidden layer which are, in turn, fully connected to the nodes of the output layer. Each link between two nodes has an associated weight. A sigmoid function is employed between the input nodes and the output nodes to map the response to a range of values between −1 and +1. A linear function is instead employed at each output node to sum all of the inputs from the hidden layer. This results in a wider range of values that an output node can assume, and adds robustness to the recognition process.

Figure 9:
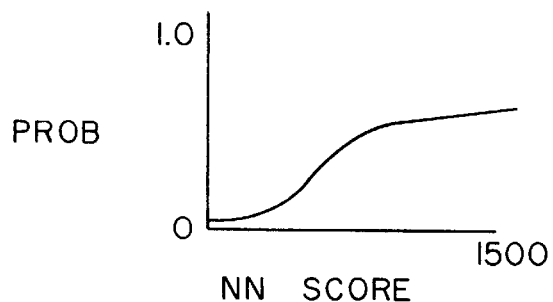
FIG. 9 is a graph that depicts a transformation between an output score of a neural network recognizer and a pseudo-probability.

In order to accommodate scores from multiple candidate lists uniformly, the score from the off-line HWR sub-system 22 is converted to a "pseudo-probability". An empirical mapping of scores to probabilities is employed for the neural networks 22a–22c, as well as for the on-line HWR sub-system 16. FIG. 9 illustrates one suitable mapping function for converting an NN output to such a pseudo-probability.

The on-line HWR subsystem 16 operates to return the 10 top candidates (i.e. the ten most probable characters having the highest scores), whereas each neural network (NN) 22a–22c returns the three top character candidates. In order to handle an out-of-candidate-list case, each candidate list is appended with an "anything-else" having a probability that is less than, for example ⅔ of, the lowest scored (lowest probability) candidate in the list. Using this technique, the four candidate lists are readily merged, as shown in the following example.

EXAMPLE

List from:

| on-line HWR 16 | | NN 22a | | NN 22b | | NN 22c | |
|---|---|---|---|---|---|---|---|
| Z | 0.1 | Z | 0.1 | z | 0.15 | 2 | 0.5 |
| 2 | 0.07 | A | 0.8 | a | 0.13 | & | 0.1 |
| z | 0.06 | L | 0.06 | e | 0.08 | 3 | 0.05 |
| y | 0.03 | else | 0.04 | else | 0.06 | else | 0.03 |
| 8 | 0.009 | | | | | | |
| 3 | 0.0085 | | | | | | |
| a | 0.0084 | | | | | | |
| . | 0.0066 | | | | | | |
| & | 0.0041 | | | | | | |
| E | 0.0040 | | | | | | |
| else | 0.0027 | | | | | | |

The resulting unified list that is output by the merge logic 24 is shown below.

unified list:
2 0.67
Z 0.29
z 0.28
a 0.21
& 0.20
A 0.18
y 0.16
3 0.16
L 0.15
8 0.14
e 0.08

In this case, the digit "2" is the most probable input character, as indicated by the top item of the unified list. The unified list score for the character "2" (0.67) is obtained from a summation of the on-line HWR score (0.07) for the character "2", the NN 22c score (0.5) for the character "2", and the "else" scores for the NN 22a (0.04) and the NN 22b (0.06).

Figure 2:
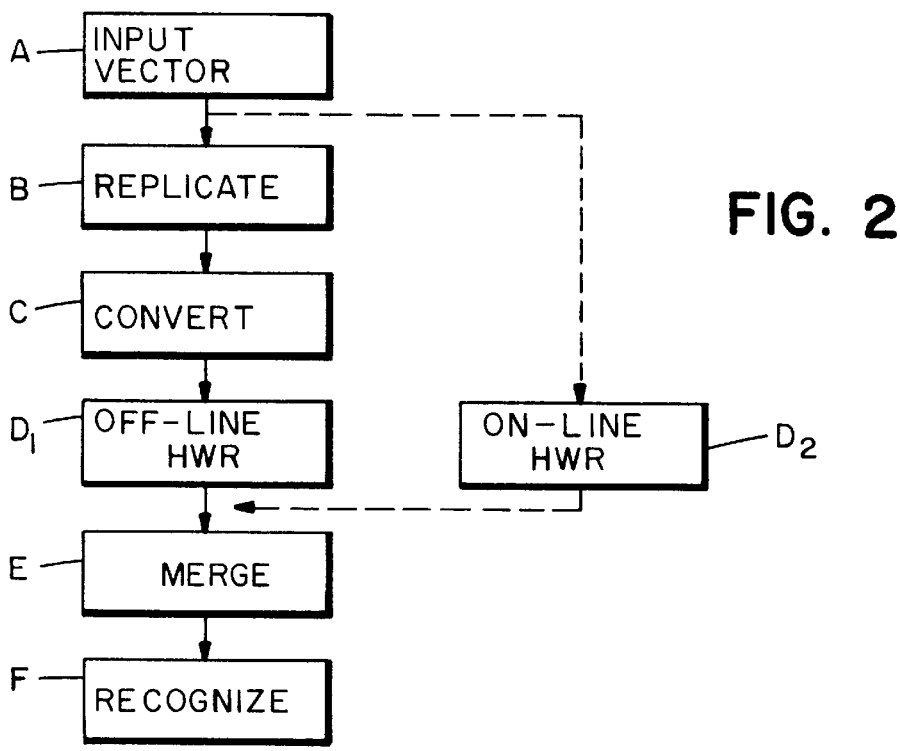
FIG. 2 is a logic flow diagram that illustrates a handwriting recognition method of this invention.

In accordance with a method of this invention, and referring to FIG. 2, a method of operating a handwriting recognition system includes the steps of (a), in response to a handwriting input from a user, providing dynamic, time ordered stroke information (Blocks A and B); (b) determining a first list comprised of at least one probable character that the dynamic, time ordered stroke information is intended to represent (Block D2); (c) converting the dynamic, time ordered stroke information to static stroke information (Block C); (d) determining a second list comprised of at least one probable character that the static stroke information represents (Block D1); and (e) merging the first list and the second list to provide a third, unified list comprised of at least one element representing a most probable character that the dynamic, time ordered stroke information is intended to represent (Blocks E and F).

The step of converting includes the steps of generating one or more first stroke features based on contour directions of the stroke information (FIG. 4). Optionally, one or more second stroke features based on, by example, convexity and concavity of the stroke information can be generated (FIG. 5).

The step of determining a second list may be accomplished with at least one neural network (FIG. 6) having a plurality of input nodes for receiving at least the first stroke features. The at least one neural network further has at least one output node for outputting at least one probable character in response to the first stroke features.

The step of converting further includes an initial step of mapping the dynamic, time ordered stroke information to an N×M bit-mapped representation thereof. The step of mapping includes a step of scaling the dynamic, time-ordered stroke information such that a stroke is wholly contained within the N×M bit-mapped representation.

The system 10 was evaluated over 24 writers, wherein each writer wrote in excess of 1600 characters. The average error rate reduction was found to be 41% for the case of the combined use of dynamic and static stroke information, as compared to the use of only the on-line HWR sub-system 16. As such, it can be seen that the use of the invention yields a significant improvement in recognition accuracy.

Although described above in the context of a presently preferred embodiment of the invention, it can be realized that more or less than three off-line (OCR) recognizers can be employed. For example, one recognizer can be employed only for digits, while another employed only to recognize special characters, such as punctuation and the like. Furthermore, the off-line recognizers may be embodied in other forms, and are not required to be neural networks. Also, the use of the invention is not limited to the recognition of handwritten English language characters and symbols, but can be employed for other languages such as, by example, Kanji.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A handwriting recognition system, comprising:

handwriting transducer means, responsive to a handwriting input from a user, for outputting corresponding time ordered stroke information;

first means, having an input coupled to an output of said handwriting transducer means, for determining a first list comprised of at least one probable character that the corresponding time ordered stroke information is intended to represent;

means, having an input coupled to said output of said handwriting transducer means, for converting the corresponding time ordered stroke information to static stroke information;

second means, having an input coupled to an output of said converting means, for determining at least one second list comprised of at least one probable character that the static stroke information represents; and means, having a first input coupled to an output of said first determining means and a second input coupled to an output of said second determining means, for merging said first list and said at least one second list to provide a third list comprised of at least one most probable character that the corresponding time ordered stroke information is intended to represent.

2. A handwriting recognition system as set forth in claim 1 wherein said converting means includes first means for generating one or more first stroke features based on contour directions of the static stroke information.

3. A handwriting recognition system as set forth in claim 2 wherein said converting means further includes second means for generating one or more second stroke features based on convexity and concavity of the static stroke information.

4. A handwriting recognition system as set forth in claim 2 wherein said second determining means is comprised of at least one neural network means having a plurality of input nodes coupled to said converting means for receiving the first stroke features, said at least one neural network means having at least one output node for outputting at least one probable character in response to the first stroke features.

5. A handwriting recognition system as set forth in claim 2 wherein said converting means includes means, responsive to the corresponding time ordered stroke information, for converting the corresponding time ordered stroke information to an N by M bit-mapped representation thereof, and wherein said first generating means is responsive to the bit-mapped representation.

6. A handwriting recognition system as set forth in claim 5 wherein said time ordered stroke converting means includes means for scaling the corresponding time-ordered stroke information such that a stroke is wholly contained within the N by M bit-mapped representation.

7. A method for operating a handwriting recognition system, comprising the steps of:

responsive to a handwriting input from a user, providing corresponding dynamic, time ordered stroke information;

converting the corresponding dynamic, time ordered stroke information to static stroke information;

determining a first list comprised of at least one probable character that the corresponding dynamic, time ordered stroke information is intended to represent;

determining a second list comprised of at least one probable character that the static stroke information represents; and merging the first list and the second list to provide a third, unified list comprised of at least one most probable character that the corresponding dynamic, time ordered stroke information is intended to represent.

8. A method as set forth in claim 7 wherein the step of converting includes a step of generating one or more first stroke features based on contour directions of the static stroke information.

9. A method as set forth in claim 7 wherein the step of converting includes a further step of generating one or more second stroke features based on convexity and concavity of the static stroke information.

10. A method as set forth in claim 8 wherein the step of determining a second list is accomplished with at least one neural network means having a plurality of input nodes for receiving the first stroke features, the at least one neural network means having at least one output node for outputting at least one probable character in response to the first stroke features.

11. A method as set forth in claim 7 wherein the step of converting includes a step of mapping the corresponding dynamic, time ordered stroke information into an N by M bit-mapped representation thereof.

12. A method as set forth in claim 11 wherein the step of mapping includes a step of scaling the corresponding dynamic, time-ordered stroke information such that a stroke is wholly contained within the N by M bit-mapped representation.

13. A method for recognizing a handwriting, comprising the steps of:

inputting one or more feature vectors representing dynamic stroke information;

converting the one or more feature vectors into an N×M representation of the one or more feature vectors;

counting occurrences of individual ones of a plurality of primitive features within the N×M representation;

generating, in response to the counted occurrences, at least one first list comprised of one or more symbols that the N×M bit-mapped image may represent;

generating, in response to the feature vectors, a second list comprised of one or more symbols that the feature vectors may represent; and generating a third list from the at least one first list and the second list, the third list including at least one most probable symbol that the feature vectors may represent.

14. A method as set forth in claim 13 wherein the step of inputting includes a step of segmenting the feature vectors.

15. A method as set forth in claim 13 wherein the step of generating at least one first list includes a step of applying the counted occurrences to inputs of at least one neural network means, the at least one neural network means having been trained to recognize at least one predetermined symbol.

16. A method as set forth in claim 13 wherein the step of generating at least one first list includes a step of applying the counted occurrences to inputs of individual ones of a plurality of neural network means, each of the plurality of neural network means having been trained to recognize at least one predetermined symbol within a predetermined class of symbols.

17. A method as set forth in claim 13 wherein the step of counting occurrences includes the steps of:

partitioning the N×M bit-mapped image into a plurality of slices;

applying an i×j mask over the N×M bit-mapped image to locate instances of primitive features; and counting the located instances within each of the plurality of slices.

18. A method as set forth in claim 17 wherein the step of applying includes a step of identifying primitive features based on contour direction.

19. A method as set forth in claim 17 wherein the step of applying includes a step of identifying primitive features based on convexity and concavity.

20. A method as set forth in claim 17 wherein the step of applying includes a step of identifying a first set of primitive features based on contour direction and a second set of feature vectors based on convexity and concavity.

* * * * *